J. W. BATE.
HOOD CLAMP.
APPLICATION FILED MAR. 10, 1920.
1,394,962.
Patented Oct. 25, 1921.
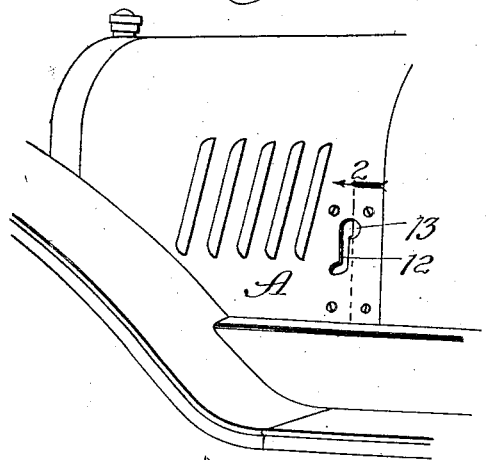
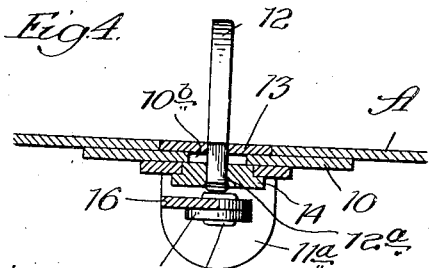
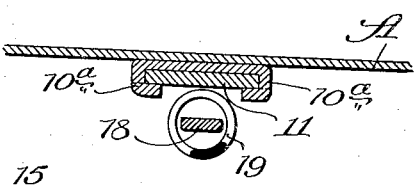
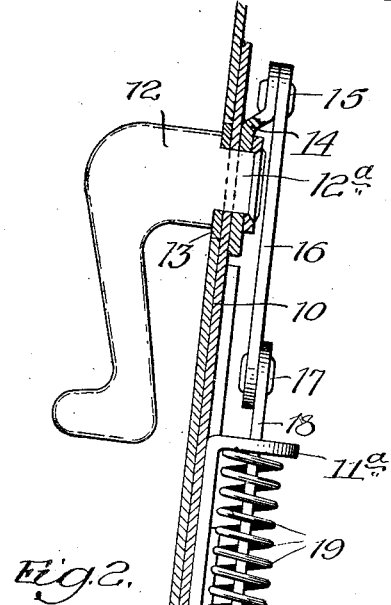
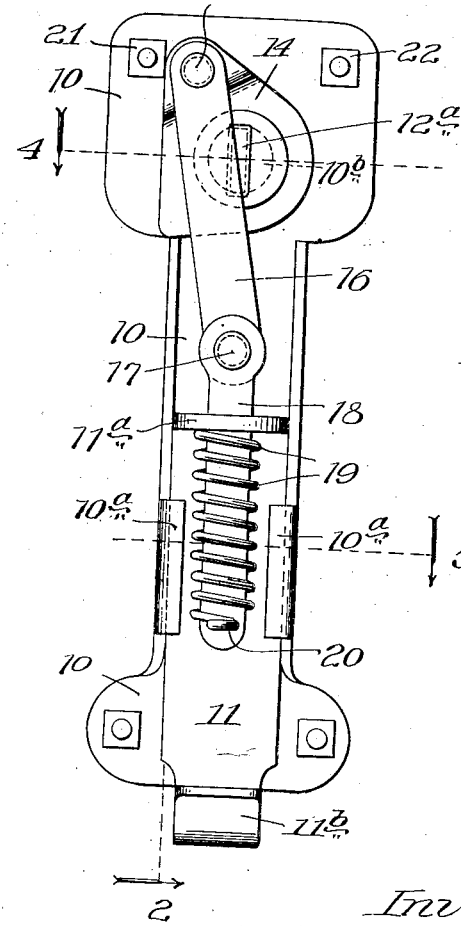
Inventor:
John W. Bate,
By Dyrenforth, Lee, Chritton & Wiles
Attys.

UNITED STATES PATENT OFFICE.

JOHN W. BATE, OF RACINE, WISCONSIN.

HOOD-CLAMP.

1,394,962.   Specification of Letters Patent.   Patented Oct. 25, 1921.

Application filed March 10, 1920. Serial No. 364,641.

*To all whom it may concern:*

Be it known that I, JOHN W. BATE, a citizen of the United States, residing at Racine, in the county of Racine and State of Wisconsin, have invented new and useful Improvements in Hood-Clamps, of which the following is a specification.

This invention relates to clamps and is particularly adapted to be used on automobile hoods, and the like.

It is an object of this invention to provide a clamp for automobile hoods which is simple and neat in appearance, economical to manufacture and which at the same time is simple and easy to apply to the automobile hood.

This and other objects is accomplished by my invention, which is fully described in the following specification and shown in the accompanying drawings, in which—

Figure 1 is a perspective view of an automobile hood equipped with one of my hood clamps;

Fig. 2 is an enlarged sectional view on the line 2 of Fig. 1;

Fig. 3 is a rear elevation of the clamp as applied to the hood;

Fig. 4 is a transverse section on the line 4 of Fig. 3; and

Fig. 5 is a section on the line 5 of Fig. 3.

The upper part of the clamp which is adapted to be secured to the automobile hood, as will later be explained, consists of a body 10, having a narrowed central portion on which are formed inturned ears $10^a$ which are adapted to act as guides, between which the members 11 may slide. A round hole $10^b$ is placed in the upper part of the body 10. An operating lever 12, having a reduced portion $12^a$ is passed through an opening which it substantially fits in the disk 13, through the hole $10^b$ and then through a lever 14, which also has a hole which the reduced portion $12^a$ substantially fits. The end of the reduced portion $12^a$ is then riveted over, as shown in Fig. 2, but is not drawn so tight but what the lever 12, together with the lever arm 14, are free to turn in the hole $10^b$.

The lever arm 14 has a pin 15, to which one end of the connecting rod 16 is secured. To the opposite end of this connecting rod link 16 is connected by means of a pin 17 with a slidable link 18, which is slidably mounted in a hole in the lug $11^a$ which is turned up from the member 11. A helical spring 19 is placed about the lower end of the sliding link 18. The upper end of the spring bears against the lug $11^a$ while the lower end is held by means of a cotter pin 20.

The automobile hood A has a round hole through which the disk 13 is inserted and holes through which bolts 21, 22, etc., may act to secure the body of the clamp thereto. The bolt at 21 is also preferably raised so as to form a stop for the lever 14, as it moves a predetermined distance in every direction, while the bolt head 22 is low enough to permit the lever 14 to pass thereover.

The automobile body B has secured thereto a flange 23, against which the lower edge of the hood bears and a hook 24 which is adapted to be engaged by an upturned hooked end $11^b$ of the movable member 11.

It will be understood that as the lever 14 is turned from the position shown in Fig. 3, in a clockwise direction, the sliding link 18 will be lowered, the pressure on the spring 19 relieved and the member 11 lowered until the hook $11^b$ will be able to pass out from under the hook 24, thereby releasing the clamp. If all the clamps on one side of the hood are thus released, the hood may be raised in the usual way by means of a hand hold not shown.

In locking, the hood A is lowered until the hook $11^b$ passes loosely under the hook 24. The operating lever 12 is then turned until the parts fill the positions shown in Figs. 2 and 3. In this position the spring 19 is depressed, thereby firmly drawing together the hook elements $11^b$ and 24. These hook elements are so bent as to bear upon each other at an angle so that they pull downward and backward upon the hood at the same time.

While I have shown and described but a single embodiment of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:—

1. In a clamp for automobile hoods, a fixed clamping element on the chassis and within the hood, having an angular projection sloping downwardly and toward the hood, a reversely sloping clamping element carried by the hood and means for engaging the sloping faces of said clamping elements whereby the hood is drawn down and toward the chassis.

2. In a clamp for automobile hoods, a fixed clamping element on the chassis and within the hood, having an angular projection sloping downwardly and toward the hood, a reversely sloping clamping element carried by the hood and means comprising an operating member passing through the hood and adapted to lower said reversely sloping clamping element so as to place it under the fixed clamping element when the hood is lowered and to raise said reversely sloping clamping element to lock said hood.

3. In a clamp for automobile hoods and the like, a fixed clamping element adapted to be secured to the chassis of the automobile, a movable clamping element adapted to engage said fixed clamping element and to be slidably mounted on the inner side of the hood, a member mounted to oscillate about an axis normal to said hood, a link connecting said oscillating member to said movable element and an operating lever for turning said oscillating member.

4. In a clamp for automobile hoods and the like, a fixed clamping element adapted to be secured to the chassis of the automobile, a movable clamping element adapted to engage said fixed clamping element and to be slidably mounted on the inner side of the hood, an oscillating member, a link pivotally connected to said oscillating member, a spring operatively connecting the link and movable element and means for operating said oscillating member.

JOHN W. BATE.